United States Patent
Cherdron et al.

[11] Patent Number: 5,166,307
[45] Date of Patent: Nov. 24, 1992

[54] POLYAMIDE AND FILM MADE FROM AT LEAST ONE MONOMOLECULAR LAYER OF A POLYAMIDE

[75] Inventors: Harald Cherdron, Wiesbaden-Naurod; Werner Prass, Mainz; Ude Scheunemann, Frankfurt am Main; Donald Lupo, Eppstein/Taunus, all of Fed. Rep. of Germany

[73] Assignee: Hoechst Aktiengesellschaft, Frankfurt am Main, Fed. Rep. of Germany

[21] Appl. No.: 402,863

[22] Filed: Sep. 5, 1989

[30] Foreign Application Priority Data

Sep. 7, 1988 [DE] Fed. Rep. of Germany ....... 3830325
Apr. 19, 1989 [DE] Fed. Rep. of Germany ....... 3912823
Apr. 19, 1989 [DE] Fed. Rep. of Germany ....... 3912824

[51] Int. Cl.$^5$ .................. C08G 63/00; C08G 69/08
[52] U.S. Cl. .................. 528/183; 427/430.1; 427/434.3; 428/336; 428/474.4; 428/474.7; 528/310; 528/331; 528/335; 528/342; 528/347; 528/348
[58] Field of Search .......... 528/347, 335, 348, 310, 528/331, 342, 183; 427/434.3; 430.1; 428/336, 474.4, 474.7

[56] References Cited

U.S. PATENT DOCUMENTS

| | | | |
|---|---|---|---|
| 4,626,468 | 12/1986 | Sundet | 428/315.5 |
| 4,740,396 | 4/1988 | Uekita et al. | 430/1 |
| 4,765,897 | 8/1988 | Cadotte et al. | 428/420 |
| 4,879,148 | 11/1989 | Neaves et al. | 428/40 |
| 4,966,799 | 10/1990 | Lucca et al. | 428/95 |

Primary Examiner—John Kight, III
Assistant Examiner—T. Mosley
Attorney, Agent, or Firm—Curtis, Morris & Safford

[57] ABSTRACT

Polyamides of the general formula $[N(A)-X-N(B)-CO-Y-CO-]_n$ are described, in which Y denotes a divalent group, X a divalent radical whose chain contains at least two carbon atoms, A and B independently of one another denote H or a $C_1$ to $C_{26}$ alkyl group and n denotes an integer greater than 4. The said polyamides contain at least one alkyl group of $C_6$ to $C_{26}$ per repeating unit. The groups X and/or Y contain at leat one $CH_2$ group in the chain. The polyamides are prepared by reaction of a diamine of the formula NHA-X-NHB with an about equimolar amount of a reactive derivative of a dicarboxylic acid of the formula COOH-Y-COOH. The polyamides obtained can be used in order to prepare highly ordered monomolecular LB films on a support. For this purpose, the polyamide is dissolved in a volatile organic solvent which is immiscible with water and the solution is spread on the water/air interface. After evaporation of the solvent the layer is compressed and transferred to a solid support by the LB technique. The film is very stable and can be used to prepare optical waveguide systems, filters for optical purposes or protective layers.

18 Claims, No Drawings

POLYAMIDE AND FILM MADE FROM AT LEAST ONE MONOMOLECULAR LAYER OF A POLYAMIDE

DESCRIPTION

The invention relates to specific polyamides with alkyl side chains, to a film made from at least one monomolecular layer of these polyamides on a solid layer support (=so-called layer elements) and a process for the preparation of the polyamides and of the layer elements.

The Langmuir-Blodgett (LB) process is predominantly used for the preparation of ordered layers of organic polymers having long-chain side groups. In this process, molecules are spread on an aqueous surface and the long alkyl side chains are arranged parallel by reducing the surface area per molecule. The molecules are taken up on a substrate under constant thrust by dipping and withdrawing. In doing this, one monomolecular layer per dipping movement is transferred with retention of the order of the said monomolecular layer.

Amphiphilic molecules, i.e. molecules which have a hydrophilic end (a "head") and a hydrophobic end (a "tail"), are used to form LB films. Polymeric LB films, too, have already been prepared in order to achieve higher stability of the LB films.

For this purpose, monomeric unsaturated amphiphiles were on one occasion polymerized after preparation of the film. However, organic polymers with long alkyl side chains have also already been used directly for layer preparation (EP-A2-0,232,829). More flaws occur, however, with both types of polymeric films than with monomeric films. In almost all cases a contraction of the layer occurs when polymerization occurs in the layer, with the formation of flaws. In the case of films made from polymers, the high viscosity of the films causes problems in the layer transfer.

The object was therefore to obtain polycondensates from low molecular weight starting materials, which polycondensates can be transferred particularly well onto layer supports.

The present invention achieves this object. It is based on the observation that components without any $CH_2$ group in the main chain lead to stiff polymers, which cannot be transferred in the film or which can be transferred only poorly and without order.

It has now been found, that ordered layers can be prepared on a solid layer support, for example with the aid of the Langmuir-Blodgett technique, from a polyamide of the general formula (I)

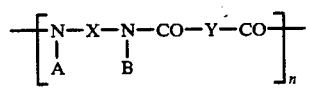

in which
Y denotes a divalent radical,
X denotes a divalent organic radical, whose chain contains at least two carbon atoms,
A and B, independently of one another denote H or $C_1$-$C_{26}$ alkyl, and
n denotes an integer greater than 4,
which polyamid has at least one alkyl group $C_6$-$C_{26}$, particularly $C_{14}$-$C_{20}$ per repeating unit and in which X and/or Y contain at least one $CH_2$ group in the chain The polyamides used are formed from strictly alternating dicarboxylic acid and diamine units. The different tendencies to order of the main polymer chain (tendency to polymer coiling) and alkyl side chain (tendency to crystallization) can be simultaneously brought about.

IR spectroscopic investigations have shown that the introduction of at least one $CH_2$ group into the main chain of the polymer causes the latter to lose stiffness and increases the order of the transferred film. This is an advantage in comparison with the very stiff compounds 76 and 77 according to EP-0,232,829.

Preferably Y in the chain is free from nitrogen. Y may, for example, represent the radical $(CH_2)_a$ in which a is an integer from 0 to 10. The group Y may also represent the radical $(CH_2-O-CH_2)_b$ in which $b$ is a number from 1 to 13. Preferably Y may also be an unsubstituted or substituted aromatic group, for example an unsubstituted or substituted phenylene or naphthalene radical.

Due to the easier accessibility of the amines and since uniform end products can be more easily obtained, it is advantageous if $A=B$.

It is moreover preferred if the radical X in the chain is free from nitrogen. For example, X may have the general formula $(CH_2)_c-X^1-(CH_2)_c$ in which C represents 0, 1 or 2 and $X^1$ represents a substituted or unsubstituted aromatic group. X may in particular denote a substituted or unsubstituted aromatic group.

If the radicals A and B are hydrogen and the groups X and/or Y contain a substituted aromatic group or comprise a substituted aromatic group, this aromatic group may be substituted by at least one of the following radicals:
COOH,
$CO_2R^6$,
$OCOR^6$,
Alkyl having 4 to 24 carbon atoms,
O-Alkyl, in which the alkyl group contains 6 to 26, particularly 14 to 24 carbon atoms
$NR^4R^5$ and
$CO-NR^4R^5$, in which
$R^4$ and $R^5$ independently of one another denote hydrogen or alkyl radicals having 1 to 26 carbon atoms and
$R^6$ denotes an alkyl group having 1 to 26, preferably 6 to 26, particularly 6 to 24, preferably 14 to 24 carbon atoms.

A high order in the layer can be achieved if the aromatic group is substituted by at least one of the following radicals
$CO_2$ alkyl, in which the alkyl group contains 1 to 24 carbon atoms,
O-alkyl, in which the alkyl group contains 14 to 24 carbon atoms,
$N(alkyl)_2$, in which the alkyl groups each contain 10 to 24 carbon atoms and
$CONR^4R^5$, in which $R^4$ and $R^5$ independently of one another denote hydrogen or an alkyl group having 1 to 24 carbon atoms.

Moreover, it has been found that films with particularly good properties can be prepared and can be transferred to layer supports if particular polyamides are used which are derived from certain aromatic diamines and certain aliphatic carboxylic acids.

The novel polyamides comprise those of the general formula (II)

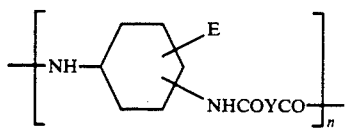

in which
- E = —CO$_2$R$^4$, —CONR$^4$R$^5$, —NR$^4$R$^5$, OR$^6$ or OCOR$^6$
- R$^4$ = an alkyl group having 6–26, preferably 6–24 carbon atoms,
- R$^5$ = hydrogen or an alkyl group having 1–26, preferably 6–24 carbon atoms,
- R$^6$ = an alkyl group having 6–26, preferably 6–24, particularly 14–24 carbon atoms
- Y = (CH$_2$)$_a$ or (CH$_2$OCH$_2$)$_b$,
- a = an integer from 1 to 12,
- b = an integer from 1 to 13,
- n = an integer greater than 4.

In this connection, a 3,5-linked phenylene radical substituted in the 1-position is a particularly preferred substituted aromatic radical.

If one of the radicals A, B denotes an alkyl group C$_1$–C$_3$ and the other denotes hydrogen or an alkyl group C$_1$–C$_3$, the aromatic groups may also be substituted by these radicals.

If at least one of the radicals A and/or B denotes a branched or unbranched alkyl radical having 4 to 24 carbon atoms and at least one of the groups X or Y contains a substituted aromatic radical or comprises a substituted aromatic radical, the aromatic group may be substituted by one of the following radicals:
- OR$^2$,
- CH$_2$OR$^2$,
- SO$_3$R$^2$,
- CONHR$^2$,
- CONHR$^2$R$^3$, in which R$^2$ and R$^3$, independently of one another, denote hydrogen, C$_1$–C$_4$ alkyl or C$_2$–C$_4$ hydroxyalkyl.

The polyamides described can be prepared by reacting a diamine of the formula
 NHA-X-NHB with about equimolar amounts of a dicarboxylic acid,
 COOH-Y-COOH or with an activated derivative of this dicarboxylic acid, A, B, X and Y having the meaning described above. Activated derivatives of the dicarboxylic acids are for example the acid chlorides, the thiophenyl esters, or other activated esters. For example, diamines of the formula
 R$^1$-NH-X-NH-R$^1$, in which R$^1$ denotes an alkyl group having 4 to 24, preferably 14 to 22 carbon atoms can be reacted with about equimolar amounts of a dicarboxylic acid dichloride of the general formula
 ClOC-R$^3$-COCl, in which R$^3$ represents a polymethylene chain having 0 to 10 carbon atoms.

Examples of dicarboxylic acids which can be used are to be found in Table 1, examples of diamines which can be used, in Table 2, and examples of prepared polyamides in Table 3. The polyamides according to Table 4 may be prepared in an identical manner.

Instead of one diamine and one diacid dichloride in each case, mixtures of diamines and diacid dichlorides may also be used for the polycondensation.

In order to prepare layer elements the polyamides according to the invention or mixtures which preferably contain 10–100% by weight of the said polyamides (remainder: other amiphiles), are dissolved in an essentially volatile solvent which is immiscible with water and introduced (=spread) on the surface of an aqueous solution in a film balance. The mean surface area per repeating unit is calculated from the size of the surface, the spread volume and the concentration of the solution. Phase transitions during the compression of the molecules can be followed in the thrust-surface isotherm.

The molecules are pushed together with a barrier, the alkyl chain being oriented essentially perpendicular to the boundary layer with increasing surface density. During the compression, a monomolecular film arises by self-organization of the molecules at the boundary layer, the constant layer thickness of the said film being determined by the chain length of the molecules and their angle of tilt (i.e. the angle at which the molecular chains on the aqueous surface are inclined from the normal). The typical thickness of a film of this type is 2–3 nm.

The film is taken from the aqueous surface under constant thrust with retention of the order by dipping or withdrawing a suitable support.

It was furthermore found that layers made from certain polyamides develop reduced thickness when heated as a consequence of a chemical reaction and that the layer which arises by this process has a particularly high heat resistance.

In order to prepare a corresponding layer element from a solid layer support and at least one solid, thin layer of a polyamide applied thereto, a polyamide of the general formula (III) is used

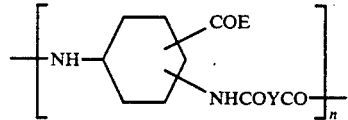

in which
- E = OR$^2$ or NR$^2$R$^3$
- R$^2$ = C$_6$ to C$_{26}$ alkyl, particularly C$_6$ to C$_{24}$ alkyl
- R$^3$ = H or C$_1$ to C$_{26}$ alkyl, particularly C$_1$ to C$_{24}$ alkyl
- Y = (CH$_2$)$_a$ or (CH$_2$OCH$_2$)$_b$
- a = an integer from 1 to 12,
- b = an integer from 1 to 13 and
- n = an integer greater than 4

In order to improve the heat stability of the films obtained, the coated support can be kept at a temperature of 150° to 450° C. for a period which is long enough for the thickness of the layer to diminish by at least 5%.

In this case also, the polyamides or mixtures which contain the polyamides according to the invention, preferably at 10–100% by weight are dissolved in an essentially volatile solvent which is immiscible with water and introduced (=spread) on the surface of an aqueous solution in a film balance, the film is compressed after evaporation of the solvent and transferred to a solid film support by the Langmuir-Blodgett technique.

It is possible by the given technique to apply one or more monolayers of the polyamide of the general formula III to the support, heating to 150° to 450° C. can be carried out after applying an individual monolayer. It is simpler, if several, i.e. at least two, better still at least 10 monolayers of the polyamide described are transferred to the layer support by the LB technique and then the coated layer support is heated.

The expression "reduction of the layer thickness by at least 5%" refers to that part of the layer which has not yet been subjected to the heating process. The layer thickness may be determined, among other means, ellipsometrically. The more monolayers a layer contains, the greater is the precision with which the percentage reduction in layer thickness on heating can be determined.

The films made from polyamides of the general formula III applied to the support are distinguished by having a good heat resistance, which can be considerably improved further by the heating procedure in air. In the heating procedure, the sample is heated to a temperature of 150°–450° C. and kept at this temperature for 0.5–240, preferably 2–200 minutes. During this procedure, the layer thickness of the film gradually decreases to a value which may be different according to the temperature, heating time and substance. Typical values for the thickness reduction are in the range between 10 and 80%; values outside this range are, however, also possible. Infrared spectroscopic investigations of the films show that essentially the alkyl side chain is split off during heat treatment. After the heat treatment, films are still stable up to temperatures of above 450° C.

The polyamides used of the general formulae II and III are derived from 1,2- or 1,3- or 1,4-phenylenediamines substituted in the nucleus. They are preferably derived from 1,3-phenylene diamines which have the substituents in 5-position.

Water or aqueous solutions are mostly used as the subphase for the preparation of monofilms. Other liquids with a high surface tension, such as, for example, glycerol, glycol, dimethyl sulfoxide, dimethylformamide or acetonitrile may also be used however, as long as the polyamides do not dissolve in these liquids.

Any desired solid, preferably dimensionally stable substrates made from different materials are suitable as supports. The substrates which are used as layer supports may, for example, be transparent or translucent, electrically conducting or insulating. The substrate may be hydrophobic or hydrophilic. The surface of the substrate, to which the LB layer is applied, may be rendered hydrophobic. The surface of the substrate which is to be coated should be as clean as possible, so that the formation of a thin, ordered layer is not disturbed. In particular, the presence of surface-active materials on the surface of the substrate which is to be coated can impair the preparation of the layer. It is possible initially to coat the substrate which is to act as layer support with an intermediate layer (on the surface which is to be coated) before applying the LB films, in order for example to improve the adhesion of the film on the substrate.

Metals, such as gold, platinum copper nickel, palladium, aluminum, chromium, niobium, tantalum, titanium, steel and the like may be used, for example, as materials for the substrates. Other suitable materials for the substrates are plastics, such as, for example, polyesters, polyethylene terephthalate or polybutylene terephthalate, polyvinyl chloride, polyvinylidene chloride, polytetrafluoroethylene, polystyrene, polyethylene or polypropylene.

Likewise, semiconductors too, such as silicon, germanium or gallium arsenide or also glass, silicon dioxide, ceramic materials or cellulose products are suitable for the substrates. The surface of glass and other hydrophilic substrates may, to the extent required, be rendered hydrophobic in a manner known per se by reaction with alkyl silanes or hexamethyldisilazane. The selection of the substrate materials is primarily governed by the intended use of the layer elements prepared from the film according to the invention. In the case of optical elements, as a rule transparent, translucent substrates are used as layer supports. If the layer elements according to the invention are used, for example, in electronics or in electrochemical processes, electrically conducting materials, such as metals or metallic surface layers, for example, on plastic films or glass, are used in particular as substrates.

According to the intended use, the substrates acting as supports for the films according to the invention may take any desired forms. They may, for example, be in the form of films, foils, sheets, ribbons or also cylinders, or may be selected in any desired shape. Layer supports are generally flat, plane substrates such as, for example, films, foils, sheets, ribbons and the like. The surface of the substrates to be coated is preferably smooth, as is normal for the preparation of LB films. In the case of flat, plane substrates the films according to the invention can be applied to one or both surfaces of the substrate.

The film according to the invention is distinguished by having a stable multilayer structure with few defects and an order in the layer which is adjustable by means of the molecular structure.

Films of this type on substrates are suitable, for example, in optical waveguide systems, or for the preparation of filters for optical purposes. Due to the low critical surface tension, the films are also suitable for improving the frictional properties of materials, for the preparation of protective layers and for other relevant applications.

The invention is described in more detail by means of the following examples.

EXAMPLE 1

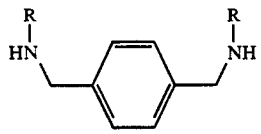

$R = -(CH_2)_{17}-CH_3$ 27.0 g (0.1 mol) of octadecylamine and 6.7 g (0.05 mol) of terephthaldialdehyde are reduced to a slurry in 400 ml of ethanol and boiled for 2 hours under reflux. The mixture is then allowed to cool overnight and the product is recrystallized from ethanol. 26.2 g (0.041 mmol) of colorless platelets are obtained, having a melting point of 73°–74° C.

$^1$H-NMR (CDCl$_3$, 100 MHz): δ=0.85 (t), 1.25 (m), 1.6 (m), 3.6 (t), 7.77 (s), 8.3 (t)

12.74 g (20 mmol) of the Schiff's base are dissolved in 200 ml of ethanol in a glass autoclave at 50° C., 12 g of freshly prepared Raney-nickel are added and hydrogenation is carried out at 3 bar for 90 minutes. Afterwards, the autoclave is cooled and decompressed. The nickel is filtered off and the ethanol removed in a rotary evaporator. The crude product is obtained in virtually quantitative yield. 1.8 g of the crude product are purified by column chromatography using silica gel (eluent chloroform/methanol 20:1 (v/v)). 1.22 g of pure product (white powder) are obtained having a melting point of 76°–78° C.

$^1$H-NMR (CDCl$_3$, 100 MHz): δ=0.85 (t), 1.25 (m), 2.28 (m), 2.6 (m), 3.75 (m), 7.26 (s).

The derivative with two N-hexadecyl chains was also prepared in accordance with this procedure.

EXAMPLE 2

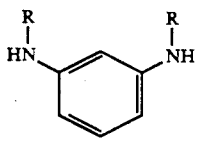

R = —(CH$_2$)$_{15}$—CH$_3$ 36.3 (0.132 mol) of palmityl chloride are dissolved in 400 ml of N-methyl pyrrolidone and a solution of 6.48 g (0.06 mol) of 1,3-phenylene diamine and 18.24 g (0.08 mol) of triethylamine in 200 ml of N-methylpyrrolidone are metered in at room temperature in the course of one hour. The mixture is allowed to remain overnight at room temperature, the precipitated product is filtered off under suction and recrystallized from chloroform and 25.6 g (44 mmol) of a white powder of melting point 133.2°–133.7° C. are obtained.

$^1$H-NMR (trifluoroacetic acid, 100 MHz): δ=0.91 (t), 1.1–1.7 (m), 1.7–2.1 (m), 2.76 (t), 7.4 (m), 7.8 (m)

11.7 g (20 mmol) of the amide prepared above are dissolved at 55° C. in 500 ml of dry tetrahydrofuran and added within a period of 10 minutes to a slurry of 10 g (0.264 mol) of LiAlH$_4$ in 100 ml of dry tetrahydrofuran. The mixture is then boiled under reflux for 22 hours. After cooling, the excess of LiAlH$_4$ is destroyed by adding 20 ml portions of water, 15% NaOH and again water, while cooling with ice. The precipitated aluminium hydroxide is filtered off under suction and the filtrate is concentrated to dryness. The crude product is dissolved in toluene and washed with water. The organic phase is dried with Na$_2$SO$_4$ and after removal of the solvent, is recrystallized from methanol. 6.5 g (12 mmol) of a light gray powder having a melting point of 88°–89° C. are obtained.

$^1$H-NMR (CDCl$_3$, 100 MHz): δ=0.87 (t), 1.0–1.4 (m), 1.4–1.8 (m), 3.08 (t), 5.8–6.1 (m), 6.96 (t)

All para- and meta-substituted N,N'-dialkyl-substituted phenylene diamines and the N,N'-dialkylsubstituted metaxylylene diamines having n-tetradecyl, n-hexadecyl and n-octadecyl radicals were synthesized in accordance with this procedure.

EXAMPLE 3

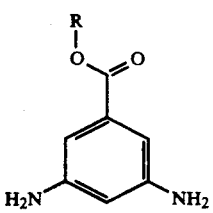

R = —(CH$_2$)$_{17}$—CH$_3$ 135.25 g (90.5 mol) of octadecanol and 75.6 g (0.75 mol) of triethylamine are dissolved in 1.2 l of dry chloroform and cooled to 10° C. by cooling with ice. A solution of 12.07 g (0.52 mol) of 3,5-dinitrobenzoyl-chloride in 350 ml of dry chloroform is then metered in within a period of 1.5 hours in such a way that the temperature does not rise above 15° C. After the addition is complete, the mixture is heated with stirring to room temperature and is subsequently stirred at room temperature for a further 2 hours. The reaction solution is then extracted three times each with 1N HCl, water, 5% Na$_2$CO$_3$ solution and again with water, the organic phase is dried with Na$_2$SO$_4$ and the solvent removed in vacuo. The crude product is recrystallized from ethanol and dried in vacuo at 30° C. 183 g (0.39 mol, 79% of theory) of light yellow colored crystals having a melting point of 74°–78° C. are obtained.

$^1$H-NMR (CDCl$_3$, 100 MH): δ=0.87 (t), 1.1–1.6 (m), 1.7–2.0 (m), 4.45 (t), 9.1–9.3 (m).

181 g (0.39 mol) of octadecyl 3,5-dinitrobenzoate are dissolved in 700 ml of toluene and hydrogenated in a 2 l stainless steel autoclave for 2 hours at 100° C. and 20 bar of H$_2$ with 5 g of Pt-carbon catalyst. After filtering off the catalyst, the solvent is removed in vacuo and the crude product is recrystallized from ethyl acetate and ethanol. 142 g (0.35 mol 90% of theory) of a white powder having a melting point of 86°–87° C. are obtained.

$^1$H-NMR (dimethyl sulfoxide-d$^6$, 100 MHz): δ=0.86 (t), 1.1–1.5 (m), 1.5–1.9 (m), 4.15 (t), 4.9 (s), 6.01 (t), 6.41 (d)

The n-tetradecyl ester, the n-hexadecyl ester, the N-hexadecylamide, the N-octadecylamide and the N,N-di-octadecylamide of 3,5-diaminobenzoic acid were prepared analogously to this procedure.

EXAMPLE 4

Polycondensation with Adipyl Dichloride 4.0 g of the diamine prepared in Example 3 and 7.1 g of triethylamine are dissolved in 50 ml of freshly distilled N-methylpyrrolidone (NMP). A solution of 1.83 g of adipyl chloride in freshly distilled NMP is added to the mixture at 5° C., while cooling with ice and the mixture is stirred for 10 minutes. The mixture is then heated to 70° C. and stirred for a further 50 minutes at this temperature. After cooling, 2 g of LiOH are added in order to dissolve the precipitated product and the polyamide is precipitated by pouring into 1 l of methanol. The product obtained (1.6 g) has a molecular weight, M$_w$ of 47,000 (light scattering).

The other synthesized diamines could also be polycondensed with adipic acid analogously to this procedure (with slight variations).

EXAMPLE 5

Polycondensation with Oxydiethanoyl Dichloride 4.04 g of N-octadecyl-3,5-diaminobenzamide and 7.1 g of triethylamine are dissolved in 50 ml of freshly distilled N-methyl pyrrolidone (NMP). A solution of 1.71 g of oxydiethanoyl dichloride in freshly distilled NMP is added to the mixture at 5° C. while cooling with ice and the mixture is stirred for 10 minutes. The mixture is then heated to 70° C. and stirred at this temperature for a further 50 minutes. After cooling, 3 g of LiOH are added in order to dissolve the precipitated product and the polyamide is precipitated by pouring into 500 ml of methanol. The product obtained (4.04 g) has a molecular weight M$_w$ of 45,000 (light scattering).

The other synthesized diamines could also be polycondensed with diglycolic acid analogously to this procedure (with slight variations).

EXAMPLE 6

Polycondensation with Terephthaloyl Dichloride 4.85 g of p-xylylene-di-(N,N'-hexadecylamine) are suspended at 50° C. in 80 ml of freshly distilled NMP and to this suspension 2.03 g of terephthaloyl dichloride, dissolved in 20 ml of dry NMP are added within a period of 20 minutes. Stirring is continued for a further 10 minutes at 50° C., then the mixture is heated to 70° C. and stirred for a further 50 minutes at this temperature. After cooling to room temperature, 3 g of LiOH are added to the reaction in order to redissolve the precipitated product. The reaction solution is then added to 500 ml of methanol with stirring, in order to precipitate the polyamide which has resulted. 3.91 g of a white powder are obtained.

Infrared spectrum (KBr): $\nu = 2921$ cm$^{-1}$, 2852 cm$^{-1}$ (CH stretching vibrations), $\nu = 1635$ cm$^{-1}$ (amide I), $\nu = 860$ cm$^{-1}$ (1,4-disubstituted aromatics.

The other synthesized diamines could also be polycondensed with terephthalic acid and phthalic acid analogously to this procedure (with slight variations).

EXAMPLE 7

Layer Preparation by the LB Process

A glass slide (76 mm × 26 mm) is cleaned by the following process: The glass is placed for 1 hour in a freshly prepared mixture at 60° C. made from four parts of concentrated H$_2$SO$_4$ and one part of 30% strength H$_2$O$_2$, rinsed with clean water and exposed to ultrasound at 50° C. for 15 minutes in a cleansing solution (®Extran AP 11, concentration 2-4 g/l). The slide is then thoroughly rinsed again with clean water and dried in a warm current of air. This is followed by a treatment with hexamethyldisilazane vapor (10 minutes at 70° C.) in order to render the slide hydrophobic.

Multilayers of the polyamide prepared in Example 5 are transferred to the glass slide by the Langmuir and Blodgett process, by which 0.25 cm$^3$ of a solution of 5 mg of the polyamide in 10 cm$^3$ of a mixture of 1 ml of N-methylpyrrolidone and 9 ml of CH$_2$Cl$_2$ are spread on an aqueous sub-phase at a sub-phase temperature of 30° C. in a Langmuir film balance. The thrust is adjusted to 30 mN/m by reducing the aqueous surface covered by the monofilm, and this value is held constant. The support is now dipped into the film balance through the aqueous surface vertically from above (dipping velocity: 10-50 mm/min) and after a short pause (10 sec.) at the lower reversal point is withdrawn again (withdrawal velocity: 10 mm/min). Here, a monolayer is transferred to the support both at the dipping operation and at the withdrawal operation. A total of 20 double layers are transferred by multiple repetition of the dipping process after a minute's waiting period at the upper reversal point in each case. The transfer ratios are approximately 90%. Optically clear, transparent layers are obtained even when 50 and more monolayers are transferred.

EXAMPLE 8

Ellipsometric Measurement of Layer Thickness and Refractive Index

A silicon platelet (40 mm × 10 mm) is cut out from a silicon wafer and cleaned as follows:

1. Treatment for 1 hour in a hot (60° C.), freshly prepared mixture of 1 part of 30% strength H$_2$O$_2$ and four parts of concentrated H$_2$SO$_4$. The platelet is then rinsed with clean water.

2. Immersion for 30 seconds in HF solution buffered with NH$_4$F followed by rinsing again with clean water.

After this treatment, the silicon platelets are hydrophobic (angle of contact with water: 75°).

Layers of the polyamide prepared in Example 4 are transferred to the silicon platelets as in Example 7 by the Langmuir and Blodgett process (sub-phase: water at 30° C., thrust: 20 mN/m, dipping velocity: 20 mm/min, withdrawal velocity: 10 mm/min, pause at the upper reversal point: 1 min.). A monolayer is transferred in each case both during dipping and during withdrawal (transfer ratio: 95%). Samples each with 10, 20, 30 and 40 monolayers of the polyamide are prepared and the layer thicknesses and the refractive index of the LB films are measured ellipsometrically (result: refractive index at 633 nm: 1.57, layer thickness: 2.28 nm/monolayer).

EXAMPLE 9

Measurements of the Heat Stability

A silicon platelet (40 mm × 10 mm) is cut out from a thermally oxidized silicon wafer (thickness of the oxide layer: 160 nm) and placed for 1 hour at 60° C. in a freshly prepared mixture of one part of 30% strength H$_2$O$_2$ and four parts of concentrated H$_2$SO$_4$. After thorough rinsing with clean water the platelet is treated for 15 minutes at 50° C. in an ultrasound bath with an alkaline cleaning bath (®Extran AP 11, concentration 2-4 g/l), thoroughly rinsed with clean water and dried in a warm current of air. The platelet is then treated with hexamethyldisilazane vapor (10 minutes at 70° C.) in order to be rendered hydrophobic.

The platelet is coated by the LB method as described in Example 8 with 8 monolayers of the polyamide prepared in Example 4.

The coated support is heated in a special apparatus having a linear temperature gradient (0.5° C./sec). During the heating process, the thickness of the LB layer is measured by observing the intensity of a perpendicularly polarized laser beam (633 nm) reflected from the sample. The temperature at which the maximum change in the layer thickness results is 180° C. in the case of the polyamide used (by comparison: in the case of LB layers made from 22-tricosoic acid this temperature is 70° C.).

EXAMPLE 10

Measurements of the Critical Interfacial Energy

A silicon platelet (40 mm × 10 mm) is cleaned as in Example 8 and coated as in Example 8 with 8 monolayers of the polyamide prepared in Example 4 (temperature of the subphase: 35° C.).

Drops of liquid from a range of n-alkanes (C$_{12}$H$_{26}$-C$_{16}$H$_{34}$) are placed on the surface of the transferred layers and the angle of contact of the drops of liquid with the surface are measured. The critical surface tension is determined from these angles of contact by Zisman's method. A value of 25.1 mN/m is obtained. (By comparison: in the case of a polyethylene surface a value of 31 mN/m is obtained from this measurement.

EXAMPLE 11

Layer Preparation from a Polyamide with a Stiff Main Polymer Chain by the LB Process A glass slide is cleaned as described in Example 7. Multilayers of the polyamide prepared in Example 6 are deposited on this glass slide by the Langmuir and Blodgett process analogously to that described in Example 7 (sub-phase: water at 30° C., thrust: 15 mN/m, dipping velocity: 20 mm/min, withdrawal velocity: 10 mm/min, pause at the upper reversal point: 1 minute, transfer ratio: 82%). 10 double layers in total are deposited on the support. Here, a monolayer is transferred in each case both during dipping and during withdrawal. A clear, transparent layer is obtained.

EXAMPLE 12

Comparison of the Orientation of the Alkyl Chains of Various Polycondensates Using Infrared Spectroscopic Methods LB multilayers of the polycondensates prepared in Examples 4 and 6 are transferred by the Langmuir-Blodgett process as described in Examples 7, 8 and 11 onto the silicon supports cleaned as in Example 8 (20 monolayers in each case) and onto layers of gold freshly evaporated onto cleaned glass (thickness of the Au layer: 120 nm, 19 monolayers transferred in each case).

Infrared spectra were measured from the substances under three different conditions in order to be able to draw conclusions concerning the alkyl chains.

1. Measurement of the IR spectrum of a KBr pressed specimen. The molecules are isotropically distributed in the KBr pressed specimen. The intensity distribution of the absorptions for an isotropic phase are therefore obtained in the spectrum.

2. Measurement of the IR spectrum of an LB film on silicon in transmission: in this measurement, all molecular groups which are vibrating parallel to the surface of the substrate have maximum absorption, while all molecular units which are vibrating perpendicular to the substrate surface should not absorb or absorb only weakly.

3. Measurement of the IR spectrum of an LB film on a gold surface in reflection with grazing incidence: with this measurement, all electrical field components in the plane of the metal become zero. All molecular components which are vibrating perpendicularly to the substrate surface now therefore absorb maximally, while no vibrations parallel to the substrate surface are excited.

In the case of the layers of the polyamide prepared in Example 4 large differences were found in the three different spectra. In transmission, the absorption of the CH vibrations between 3000 and 2800 cm$^{-1}$ is intensified. The same peaks are significantly weakened on reflection with grazing incidence. This indicates that here, the alkyl chains are essentially arranged perpendicularly to the substrate surface.

With the layers of polymer prepared in Example 6, no difference results between the three different spectra, which indicates little order in the alkyl chains in the LB layers.

EXAMPLE 13

Ellipsometric Measurements of Layer Thickness and Refractive Index of LB Films After Various Heat Treatment Operations.

A silicon platelet (40 mm × 10 mm) is cut out from a silicon wafer and cleaned as follows:

1. Treatment for 1 hour in a hot (60° C.) freshly prepared mixture of 1 part of 30% strength $H_2O_2$ and four parts of concentrated $H_2SO_4$. The platelet is then rinsed with clean water.

2. Immersion for 30 seconds in HF solution buffered with $NH_4F$ and then rinsing again with clean water. After this treatment, the silicon platelets are hydrophobic (angle of contact with water: 75°).

Layers of the polyamide made from N-octadecyl-3,5-diaminobenzamide and adipic acid (MW=100,000) are transferred to silicon platelets by the Langmuir and Blodgett process (transfer parameters: sub-phase: water at 30° C., thrust: 30 mN/m, dipping velocity: 10 mm/min, withdrawal velocity: 20 mm/min, pause at the upper reversal point: 60 s). Samples are prepared each having 8, 20 and 30 monolayers. The samples are then placed on a previously temperature-regulated hotplate for 5 minutes in each case in air at temperature of 160° C., 250° C. and 320° C. Two comparative samples are left untreated. The layer thicknesses of the samples which have had different heat treatments and which were originally coated to different thicknesses, are then determined ellipsometrically and compared with the thicknesses of the untreated samples. In the case of the 160° C. sample, no reduction in thickness can be observed. The thickness of the 250° C. sample has reduced by 18% from the original thickness and that of the 320° C. sample by 72%. In all cases, the reduction in thickness is uniform and proportional to the original thickness of the LB films.

EXAMPLE 14

Infrared spectroscopic ATR measurements on heat-treated and non-heat-treated layers.

Undoped silicon platelets (50 mm × 10 mm × 1 mm) polished on both sides are ground trapezoidally at the leading edges at an angle of 45° and polished, so that they can be used as substrate for infrared ATR measurements. The platelets are cleaned as in Example 13, pretreated and coated by the Langmuir and Blodgett process with layers of a polyamide made from N-octadecyl-3,5-diaminobenzamide and adipic acid (MW=100,000) (transfer parameters: subphase: water at 30° C., thrust: 30 mN/m, dipping velocity: 10 mm/min, withdrawal velocity: 20 mm/min, pause at the upper reversal point: 60 s). Infrared ATR spectra (ATR=attenuated total reflection) were then taken from the samples with a grating spectrometer supplied by Perkin Elmer (PE 580 B) in the wavelength range between 4,000 and 1,200 cm$^{-1}$. The samples are then heat-treated as in Example 13 at temperatures of 160° C., 250° C., 320° C. and 420° C. and again measured by infrared spectroscopy. A comparison of the spectra reveals the following: no changes result from heat treatment at 160° C. Heat treatment at 250° C. results in a slight reduction in the region of the CH vibrations between 3,000 and 2,500 cm$^{-1}$. After treatment at 320° C., these absorption peaks have almost completely disappeared while those in the region of wave numbers less than 1,800 cm$^{-1}$ have only decreased by about half.

Heat treatment at 420° C. results in a further, but by no means complete reduction of the absorption at wave numbers of less than 1,800 cm$^{-1}$.

EXAMPLE 15

Microscopic Observation of a Polyamide LB Layer During a Heating Operation.

A silicon platelet is cleaned as in Example 13, pretreated and coated with 40 monolayers of a polyamide made from tetradecyl 3,5-diaminobenzoate and adipic acid (MW=25,000) (transfer parameters: sub-phase: water at 30° C., thrust: 30 mN/m, dipping velocity: 10 mm/min, withdrawal velocity: 20 mm/min, pause at the upper reversal point: 60 s. The platelet is then divided and a 10 mm×10 mm sized piece thereof is placed in a microscope heating stage supplied by Linkham and heated. During heating, the layer on the sample is observed microscopically by the differential interference contrast method. At 250° C., a reduction in thickness of the film is visible by a color change. The reduction in thickness progresses as the temperature is raised further. Although at temperatures of above 500° C. the layer is progressively thinner, it is uniform and devoid of visible defects.

TABLE 1

Dicarboxylic acids which can be used.

HO—C—Y—C—OH
    ‖    ‖
    O    O

Y

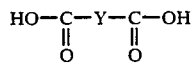

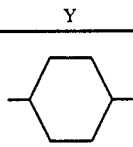

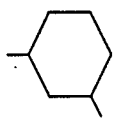

—(CH$_2$)$_4$—
—CH$_2$OCH$_2$—
—(CH$_2$OCH$_2$)$_{10}$—

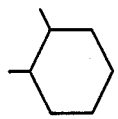

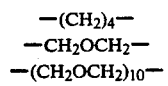

(Oxalyl)

TABLE 2

Amines which can be used.

HN—X—NH
 |    |
 A    B

| A = B | X |
|---|---|
| n-C$_{18}$H$_{37}$ | 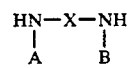 |
| n-C$_{16}$H$_{33}$ | " |
| n-C$_{16}$H$_{33}$ | 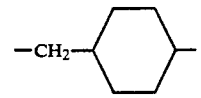 |
| n-C$_{14}$H$_{29}$ | " |
| n-C$_{18}$H$_{37}$ | " |
| H | 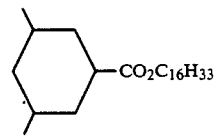 |
| H | 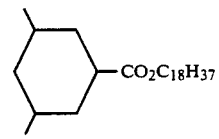 |
| H | 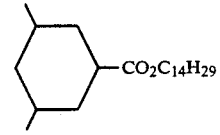 |
| H | 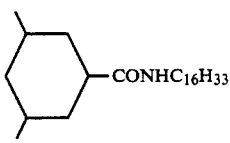 |
| H | 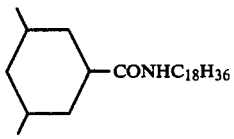 |
| H | 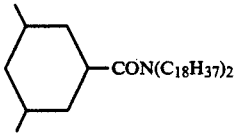 |
| n-C$_{14}$H$_{29}$ | 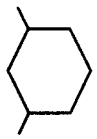 |

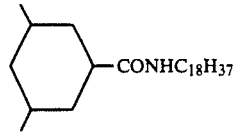

TABLE 4-continued $$-\left[\begin{array}{c}N-X-N-CO-Y-CO\\ |\quad\quad |\\ H\quad\quad H\end{array}\right]_n$$

| X | Y |
|---|---|
| $-(CH_2)_4-$ | " |
| $-(CH_2)_4-$ | cyclohexyl with CN and $CONHC_4H_9$ substituents |
| $-(CH_2)_4-$ | decalin with methyl and $SO_2NH_2$ substituents |
| $-(CH_2)_4-$ | $>CH-$cyclohexyl$-NHC_{10}H_{21}$ |
| $-(CH_2CH_2O)_3-CH_2CH_2-$ | cyclohexyl$-NHCOC_{18}H_{37}$ |
| $-(CH_2)_4-$ | cyclohexyl$-OC_{18}H_{37}$ |

We claim:

1. A polyamide of the formula $$-\left[NH-\underset{NHCOYCO}{\overset{E}{\bigcirc}}\right]_n$$

in which
E is $-CO_2R^4$, $-CONR^4R^5$, $-NR^4R^5$, $OR^6$ or $OCOR^6$,
$R^4$ is an alkyl group having 6–26 carbon atoms,
$R^5$ is hydrogen or an alkyl group having 1–26 carbon atoms,
$R^6$ is an alkyl group having 6–26 carbon atoms,
Y is $(CH_2)_a$ or $(CH_2OCH_2)_b$,
a is an integer from 1 to 12,
b is an integer from 1 to 13, and
n is an integer greater than 4.

2. A polyamide as claimed in claim 1, wherein $R^4$ is an alkyl group having 6–24 carbon atoms.

3. A polyamide as claimed in claim 1, wherein $R^5$ is an alkyl group having 6–24 carbon atoms.

4. A polyamide as claimed in claim 1, wherein $R^6$ is an alkyl group having 6–24 carbon atoms.

5. A polyamide as claimed in claim 4, wherein $R^6$ is an alkyl group having 14–24 carbon atoms.

6. The polyamide as claimed in claim 1, wherein the aromatic group represents a 3,5-linked phenyl radical substituted in the 1-position.

7. A layer element having a solid layer support and at least one solid, thin layer of defined uniform orderly structure applied thereto, which layer comprises at least one polyamide of the formula $$-\left[NH-\underset{NHCOYCO}{\overset{E}{\bigcirc}}\right]_n$$

in which
E is $-CO_2R^4$, $-CONR^4R^5$, $-NR^4R^5$, $OR^6$ or $OCOR^6$,
$R^4$ is an alkyl group having 6–26 carbon atoms,
$R^5$ is hydrogen or an alkyl group having 1–26 carbon atoms,
$R^6$ is an alkyl group having 6–26 carbon atoms,
Y is $(CH_2)_a$ or $(CH_2OCH_2)_b$,
a is an integer from 1 to 12,
b is an integer from 1 to 13 and
n is an integer greater than 4.

8. The layer element having a solid layer support as claimed in claim 7, wherein the polyamide contains at least one compound of the general formula $$-\left[NH-\underset{NHCOYCO}{\overset{E}{\bigcirc}}\right]_n$$

in which
E is $-CO_2R^4$, $-CONR^4R^5$, $-NR^4R^5$, $OR^6$ or $OCOR^6$,
$R^4$ is an alkyl group having 6–24 carbon atoms,
$R^5$ is hydrogen or an alkyl group having 6–24 carbon atoms,
$R^6$ is an alkyl group having 6–24 carbon atoms,
Y is $(CH_2)_a$ or $(CH_2OCH_2)_b$,
a is an integer from 1 to 12,
b is an integer from 1 to 13 and
n is an integer greater than 4.

9. The layer element having a solid support as claimed in claim 8, wherein $R^6$ is an alkyl group having 14–24 carbon atoms.

10. A layer element having a solid layer support and at least one solid, thin layer of defined uniform orderly structure applied thereto, which layer comprises at least one polyamide of the general formula (II)

$$-\left[NH-\underset{NHCOYCO}{\overset{E}{\bigcirc}}\right]_n$$

in which
E is $-CO_2R^4$, $-CONR^4R^5$, $-NR^4R^5$, $OR^6$ or $OCOR^6$,
$R^4$ is an alkyl group having 6–26 carbon atoms,
$R^5$ is hydrogen or an alkyl group having 1–26 carbon atoms,
$R^6$ is an alkyl group having 6–26 carbon atoms,
Y is $(CH_2)_a$ or $(CH_2OCH_2)_b$,
a is an integer from 1 to 12,
b is an integer from 1 to 13 and n is an integer greater than 4.

11. The layer element having a solid layer support as claimed in claim 7, wherein the polyamide contains at least one compound of the general formula

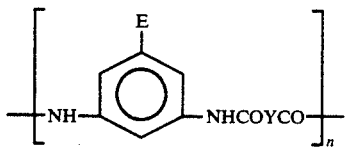

in which
E is $-CO_2R^4$, $-CONR^4R^5$, $-NR^4R^5$, $OR^6$ or $OCOR^6$,
$R^4$ is an alkyl group having 6–26 carbon atoms,
$R^5$ is hydrogen or an alkyl group having 1–26 carbon atoms,
$R^6$ is an alkyl group having 6–26 carbon atoms,
Y is $(CH_2)_a$ or $(CH_2OCH_2)_b$,
a is an integer from 1 to 12,
b is an integer from 1 to 13 and
n is an integer greater than 4.

12. A process for the preparation of a layer element as claimed in claim 7, which comprises dissolving at least one polyamide of the formula

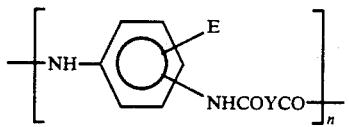

in which
E is $-CO_2R^4$, $-CONR^4R^5$, $-NR^4R^5$, $OR^6$ or $OCOR^6$,
$R^4$ is an alkyl group having 6–26 carbon atoms,
$R^5$ is hydrogen or an alkyl group having 1–26 carbon atoms,
$R^6$ is an alkyl group having 6–26 carbon atoms,
Y is $(CH_2)_a$ or $(CH_2OCH_2)_b$,
a is an integer from 1 to 12,
b is an integer from 1 to 13, and
n is an integer greater than 4,
in a volatile organic solvent which is immiscible with water, spreading the solution on the water/air interface, compressing the layer after evaporation of the solvent and transferring it to a solid layer support by the Langmuir-Blodgett technique.

13. The layer element having a solid layer support as claimed in claim 7, wherein E in the polyamide is $-CO_2R^4$.

14. The process as claimed in claim 12, wherein a compound of the general formula

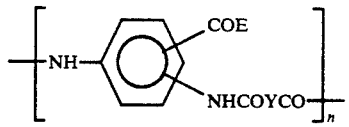

is used as polyamide, in which formula
E is $OR^2$ or $-NR^2R^3$,
$R^2$ is $C_6-C_{26}$alkyl,
$R^3$ is H or $C_1-C_{26}$alkyl,
Y is $(CH_2)_a$ or $(CH_2OCH_2)_b$,
a is an integer from 1 to 12,
b is an integer from 1 to 13, and
n is an integer greater than 4,
and the coated support is kept at a temperature of 150° to 400° C. for a period which is sufficient in order to reduce the thickness of the layer by at least 5%.

15. The process as claimed in claim 14, wherein in the compound, $R^2$ is $C_6-C_{24}$alkyl.

16. The process as claimed in claim 14, wherein in the compound, $R^3$ is $C_1-C_{24}$alkyl.

17. A process for the preparation of a polyamide as claimed in claim 1, which comprises reacting a diamine of the formula

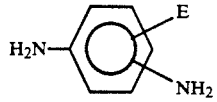

with approximately equimolar amounts of a dicarboxylic acid of the formula

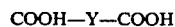

COOH—Y—COOH or an activated derivative of this dicarboxylic acid, in which
E is $-CO_2R^4$, $-CONR^4R^5$, $-NR^4R^5$, $OR^6$ or $OCOR^6$, and
Y is $(CH_2)_a$ or $(CH_2OCH_2)_b$,
a is an integer from 1 to 12, and
b is an integer from 1 to 13.

18. The process as claimed in claim 14, wherein at least two monolayers containing a polyamide are applied to the layer support and then layer support with coating are heated to 150°–400° C.

* * * * *